US008086483B1

(12) United States Patent
Yuan et al.

(10) Patent No.: US 8,086,483 B1
(45) Date of Patent: Dec. 27, 2011

(54) ANALYSIS AND NORMALIZATION OF QUESTIONNAIRES

(75) Inventors: John Yuan, Manchester, CT (US); Kevin A. Soucy, Sterling, MA (US)

(73) Assignee: Accenture Global Services Limited, Dublin (IE)

( * ) Notice: Subject to any disclaimer, the term of this patent is extended or adjusted under 35 U.S.C. 154(b) by 614 days.

(21) Appl. No.: 12/247,128

(22) Filed: Oct. 7, 2008

(51) Int. Cl.
*G06Q 10/00* (2006.01)
*G06Q 40/00* (2006.01)

(52) U.S. Cl. ............ 705/7.39; 705/7.32; 705/7.36; 705/36 R

(58) Field of Classification Search ............ None
See application file for complete search history.

(56) References Cited

U.S. PATENT DOCUMENTS

| | | | |
|---|---|---|---|
| 6,574,621 B1 * | 6/2003 | Lautzenheiser et al. | 1/1 |
| 6,609,110 B1 | 8/2003 | Dowd et al. | 705/36 |
| 7,188,076 B2 | 3/2007 | Bensemana | 705/10 |
| 7,870,051 B1 | 1/2011 | En et al. | 705/36 R |
| 2002/0091563 A1 * | 7/2002 | Wasa | 705/10 |
| 2002/0107823 A1 * | 8/2002 | Lefebvre et al. | 706/46 |
| 2002/0152151 A1 | 10/2002 | Baughman et al. | 705/36 |
| 2003/0088489 A1 | 5/2003 | Peters et al. | 705/36 |
| 2003/0144899 A1 * | 7/2003 | Kokubo | 705/10 |
| 2003/0208427 A1 * | 11/2003 | Peters et al. | 705/36 |
| 2005/0027632 A1 | 2/2005 | Zeitoun et al. | 705/36 |
| 2005/0119931 A1 * | 6/2005 | Schall | 705/10 |
| 2005/0154662 A1 * | 7/2005 | Langenwalter | 705/35 |
| 2006/0136283 A1 * | 6/2006 | Sabharwal et al. | 705/10 |
| 2007/0078674 A1 * | 4/2007 | Weinberg et al. | 705/1 |
| 2007/0094067 A1 * | 4/2007 | Kumar et al. | 705/10 |
| 2007/0174108 A1 * | 7/2007 | Monster | 705/10 |
| 2008/0288271 A1 * | 11/2008 | Faust | 705/1 |
| 2009/0070188 A1 | 3/2009 | Scott et al. | 705/10 |
| 2009/0106080 A1 * | 4/2009 | Carrier et al. | 705/10 |
| 2009/0276233 A1 * | 11/2009 | Brimhall et al. | 705/1 |

OTHER PUBLICATIONS

Bolton "Pretesting Questionnaires: Content Analyses of Respondents' Concurrent Verbal Protocols" (1993) Marketing Science, vol. 12, No. 3.*
Olson "An Examination of Questionnare Evaluation by Expert Reviewers" (2010) University of Nebraska, Sociology Department (http://digitalcommons.unl.edu/sociologyfacpub/136).*
Office Action, dated Feb. 14, 2011, pp. 1-10, U.S. Appl. No. 12/247,121, U.S. Patent and Trademark Office, Virginia.
Office Action, dated Jul. 18, 2011, pp. 1-12, U.S. Appl. No. 12/247,121, U.S. Patent and Trademark Office, Virginia.

* cited by examiner

*Primary Examiner* — Lynda Jasmin
*Assistant Examiner* — Sujay Koneru
(74) *Attorney, Agent, or Firm* — Brinks Hofer Gilson & Lione

(57) ABSTRACT

In one example, normalized questionnaires may be used to consistently determine an assessment regardless of which of the questionnaires is used. The normalization may include verification that a category score is consistently determined regardless of which of the questionnaires is used. The category score included in the assessment may be determined as a function of answers provided in response to each of the questions that are included in a questionnaire and that are directed to a question category. Normalization may include selection of focus questions from among the questions that are directed to the question category. Normalization may include determination of category scores, where each of the category scores is determined based on a respective answer to each one of the focus questions.

16 Claims, 11 Drawing Sheets

| ID | Question | Answer | Portfolio Objective | Time Horizon | Risk Tolerance |
|---|---|---|---|---|---|
| 1 | My current age is: | | | 4 | |
| | Under 30 years | A | | 3 | |
| | 30 – 45 years | B | | 2 | |
| | 45 – 55 years | C | | 1 | |
| | Over 55 years | D | | | |
| 2 | Annual personal income before tax? | | | | |
| | Under $25,000 | A | | | 1 |
| | $25,000 - $49,999 | B | | | 2 |
| | $50,000 - $99,999 | C | | | 3 |
| | $100,000 - $250,000 | D | | | 4 |
| 3 | I plan to start | | | | |

| ID | Question | Answer | Portfolio Objective | Time Horizon | Risk Tolerance |
|---|---|---|---|---|---|
| 1 | My current age is: | | | | |
| | Under 30 years | A | | 4 | |
| | 30 – 45 years | B | | 3 | |
| | 45 – 55 years | C | | 2 | |
| | Over 55 years | D | | 1 | |
| 2 | Annual personal income before tax? | | | | |
| | Under $25,000 | A | | | 1 |
| | $25,000 - $49,999 | B | | | 2 |
| | $50,000 - $99,999 | C | | | 3 |
| | $100,000 - $250,000 | D | | | 4 |
| 3 | I plan to start | | | | |

Figure 2

| Primary Category | Secondary Category | Common | BU1 | BU2 | BU3 | BU4 | BU5 | BU6 | BU7 |
|---|---|---|---|---|---|---|---|---|---|
| Overall Portfolio Objective 108 | Fund Purpose | 1A | 1A(V1) | 1A(V1) | 1A(V1) | 1A(V2) | 1A(V2) | 1A(V2) | 1A(V2) |
| | Investment Objective | 4A | 4A | 4A | 4A | 4A | 4A | 4A | 4A, 4B |
| | Return Expectation | 4C | 4C | 4C | 4C | 4C | 4C | 4C | 4C |
| | Inflation Concern | | | | | 4D | 4C | 4C | 4C |
| | Income Requirement | | | | | 5A | 5A | 5A | 5D |
| | Liquidity Requirement | | | | | 5B | 5B | 5B | 5E |
| | Possible Lifestyle Changes | | | | | 5C | 5C | 5C | |
| Investment Time Horizon 104 | Accumulation Phase | 6A | 6A | 6A | 6A | 6A | 6A | 6A | 6A |
| | Withdrawal Phase | | | | | 6B | 6B | 6B | 6B |
| Risk Tolerance 106 | Personal Income | 3A | | 3A(V1) | 3A(V2) | 3A(V2) | 3A(V2) | 3A(V2) | |
| | Investment Asset/Net Worth | 3B | | 3B(V1) | 3B(V2) | 3B(V2) | 3B(V2) | 3B(V2) | |
| | Goal & Date Flexibility | | | | | 8A | 8A | 8A | |
| | Investment Knowledge | | 7A | 7A | 7A | | | | |
| | Investment Experience | 7B | 7B | 7B | 7B | 7B | 7B | 7B | |
| | Market Volatility | 2B, 8C | 2B, 8C | 2B, 8C | 2B, 8C | 2B, 8C | 2B, 8C | 2B, 8C | 8C |
| | Loss Tolerance/Avoidance | 2B, 8E | 2B | 2B, 8E | 2B, 8E | 2B, 8E | 2B, 8E | 2B, 8E | |
| | Worrying about money | | | | | | | | |
| | Risk Seeking | 2B | 2B | 2B | | 2B | 2B | 2B | |
| | Risk vs. Return | 2B, 8D | 2B | 2B, 8D(V1) | 2B, 8D(V2) | 2B, 8D(V3) | 2B, 8D(V3) | 2B, 8D(V3) | |
| Others | Account Types | | | | | | | 2A | 2A |
| | Tax Situation | | | | | 9A | | | |

Figure 5

Questions Score Matrix

Portfolio Objective Questions

|   | 4A | 4B | 4C | 4D | 5A | 5D | 5B/5E |
|---|----|----|----|----|----|----|-------|
| A | 0  | 0  | 8  | 0  | 5  | 3  | 8     |
| B | 2  | 8  | 4  | 0  | 2  | 2  | 4     |
| C | 4  | 4  | 2  | 4  | 1  | 1  | 0     |
| D | 8  |    | 0  | 6  | 0  | 0  | 0     |
| E | 12 |    | 0  | 8  |    |    |       |

Figure 6

| Example Scenario | Answers | | | | | Scores Lookup | | Objective Score | | |
|---|---|---|---|---|---|---|---|---|---|---|
| | | Safety | | | | | | | | |
| 1 | A | E | | | | 0 | 0 | 0 | 0% | |
| 2 | A | D | | | | 0 | 0 | 0 | 0% | |
| | | Income | | | | | | | | |
| 4 | B | D | | | | 2 | 0 | 2 | 10% | |
| 5 | B | C | | | | 2 | 2 | 4 | 20% | |
| | | Income & Mod Growth | | | | | | | | |
| 7 | C | C | | | | 4 | 2 | 6 | 30% | |
| 8 | C | B | | | | 4 | 4 | 8 | 40% | |
| | | Balanced Growth | | | | | | | | |
| 10 | C | B | | | | 4 | 4 | 8 | 40% | |
| 11 | C | C | | | | 4 | 2 | 6 | 30% | |
| 12 | D | B | | | | 8 | 4 | 12 | 60% | |
| 13 | D | C | | | | 8 | 2 | 10 | 50% | |
| | | Aggressive Growth | | | | | | | | |
| 15 | E | A | | | | 12 | 8 | 20 | 100% | |
| 16 | | | | | | | | | | |
| | | Max Equity Growth | | | | | | | | |
| 18 | E | A | | | | 12 | 8 | 20 | 100% | |

Figure 7

ANALYSIS AND NORMALIZATION OF QUESTIONNAIRES

CROSS REFERENCE

Cross reference is made to co-pending U.S. patent application Ser. No. 12/247,121 entitled "INVESTMENT PROFILE QUESTIONNAIRE SYSTEM" by John Yuan and Kevin A. Soucy, filed Oct. 7, 2008.

TECHNICAL FIELD

This application relates to questionnaires and, in particular, to analysis, normalization, or a combination thereof of multiple questionnaires.

BACKGROUND

Questionnaires may be used to profile people or organizations. For example, in the investment marketplace, answers provided in response to questions in a questionnaire may be used to profile an investor. The profile may form the basis on which to provide financial asset recommendations.

A questionnaire may be used to generate a score that represents a profile of an investor taking the questionnaire. Although useful, the score may not provide complete information about the investor.

It may be desirable to use different questionnaires to determine a profile of a person or an organization even if each of the questionnaires is used to profile the same subject matter. For example, different business units of a company may all want to profile, an investor, but each of the business units may want to include different questions in its respective questionnaire. For example, a business unit that sells investment assets exclusively to discretionary clientele may want to use different questions than a business unit that sells investment assets to individual investors who only have non-discretionary accounts. A different profile of the investor may be determined depending on the questionnaire used.

SUMMARY

By way of introduction, the examples described below include a system to analyze a questionnaire, a method of normalizing multiple questionnaires, and a method of normalizing questionnaires.

In a first example, the system may analyze the questionnaire that is used to determine an assessment from answers provided in response to questions included in the questionnaire. The system may include computer code to receive a user selection of focus questions from among the questions directed to a question category. The system may also include computer code to determine a category score corresponding to the question category as a function of answers included in a sample scenario, where each of the answers included in the sample scenario is the answer to one of the focus questions and where each of the answers is applicable to a common scenario type.

In a second example, the method of normalizing questionnaires is provided. After normalization, each of the questionnaires is used to consistently determine an assessment from answers selected in response to questions included in each respective one of the questionnaires regardless of which of the questionnaires is used. The method may include verifying that a category score is consistently determined regardless of which of the questionnaires is used. The category score may be included in the assessment and may correspond to a question category. At least one of the questions included in each respective one of the questionnaires may be directed to the question category. The category score is determined as a function of answers provided in response to each of the questions that are included in a questionnaire and that are directed to the question category. The verification may include selection of focus questions from among the questions directed to the question category. The verification may also include a determination of category scores, where each of the category scores is determined based on the respective answer to each one of the focus questions.

The method may also include, for example, determining overall scores corresponding to sample scenarios, where each of the overall scores is determined based on answers included in a corresponding one of the sample scenarios. Furthermore, the method may include providing assessed types, where the assessment includes one of the assessed types. Value ranges may be determined, where each of the value ranges corresponds to a respective one of the assessed types. Each of the value ranges may include possible category scores that are indicative of the corresponding one of the assessed types.

In a third example, the method of normalizing questionnaires is provided. After normalization, each of the questionnaires is useable to consistently determine an assessment from answers selected in response to questions included in one of the questionnaires regardless of which of the questionnaires is used. The method may include determining overall scores, where each of the overall scores is determined based on a respective one of multiple sets of answers to the questions, where each of the sets of the answers is applicable to one of multiple sample scenarios. The method may also include determining a total number of each of the overall scores. The method may include generating a graph of the total number of each of the overall scores versus the corresponding one of the overall scores.

Further objects and advantages of the present invention will be apparent from the following description, reference being made to the accompanying drawings wherein preferred embodiments of the present invention are shown.

BRIEF DESCRIPTION OF THE DRAWINGS

The innovation may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

FIG. 2 is a portion of an example questionnaire that may be included in a system to model an investment profile of an investor;

FIG. 5 illustrates an example of an outline of multiple questionnaires;

FIG. 6 illustrates an example of distinct questions directed to a question category;

FIG. 7 illustrates an example analysis of focus questions as applied to sample scenarios;

DETAILED DESCRIPTION

Questions in a questionnaire may include questions about an investor's risk tolerance, investment time horizon, portfolio objective, and demographics. Answers to the questions may be assigned answer values. A score may be computed by summing the answer values assigned to the answers that the investor provides in response to questions included in the questionnaire. The score relative to the highest and lowest possible scores may provide a basis on which to automatically generate financial asset recommendations for the investor.

In one example, an investment profile of the investor may include an overall score and, additionally or alternatively, category scores corresponding to question categories. Each of the question categories may represent a different aspect of the investment profile than the other. Category scores corresponding to question categories may, for example, enable better matching of financial assets to the investment profile of the investor.

Figure 1:
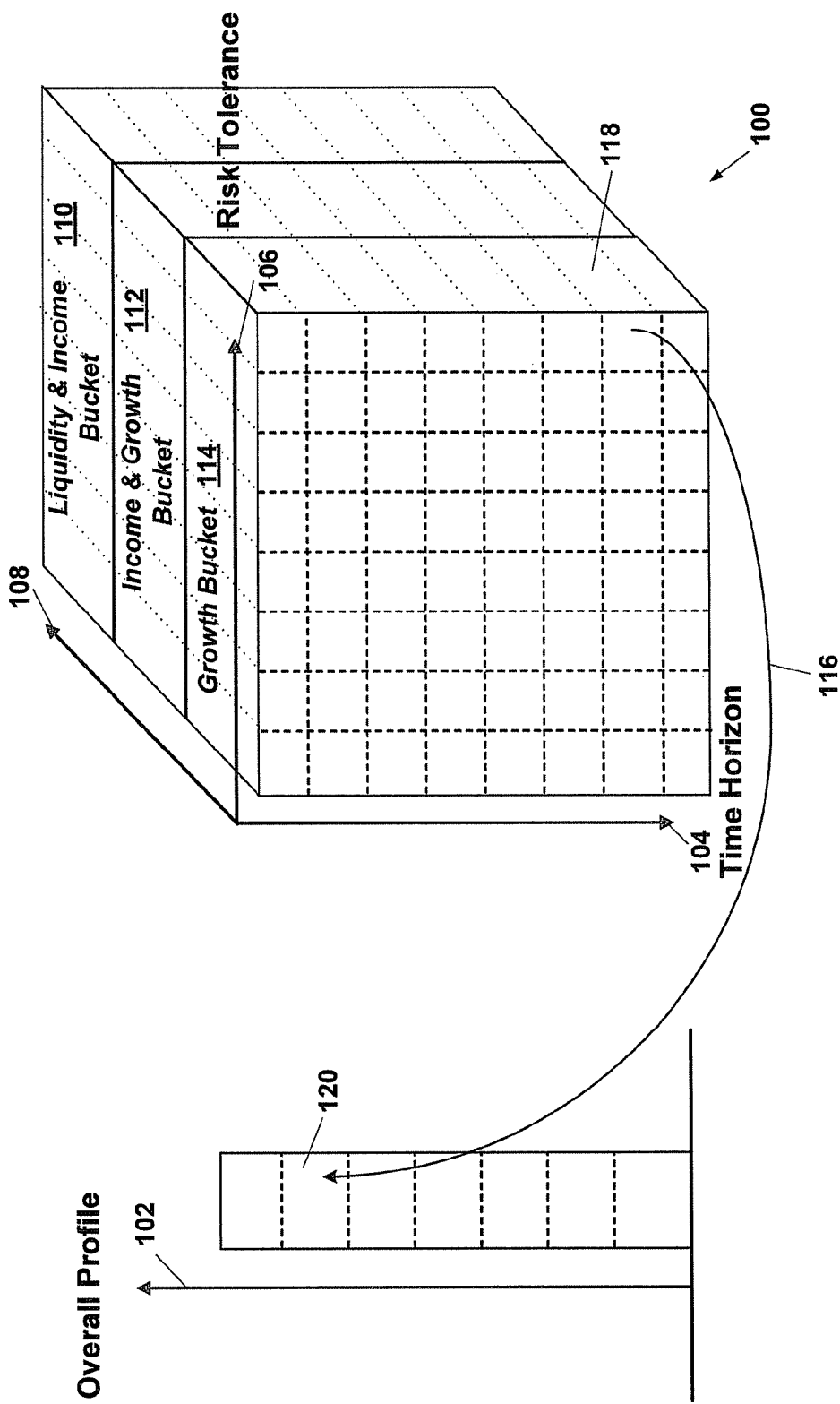
FIG. 1 is an example of a system to model an investment profile of an investor.

FIG. 1 is an example of a system 100 to model the investment profile of the investor. A profile may be a set of characteristics or qualities that identify a type or category of person, place, or thing. The investment profile may be a set of characteristics that identify a type of the investor. In particular, the investment profile may include an overall score 120 indicative of an overall profile 102 and, additionally or alternatively, category scores corresponding to question categories 104, 106, and 108. For example, the overall profile 102 may correspond to one of several common investment profiles. The overall score 120 may be indicative of which one of the common investment profiles that applies to the investor. A "category score" is defined as a number indicative of an assessment in a corresponding question category 104, 106, and 108. The "question category" 104, 106, and 108 is defined as subject matter about which a question is designed to obtain information.

For example, the question categories 104, 106, and 108 may include a time horizon category 104, a risk tolerance category 106, and a portfolio objective category 108. A first category score may correspond to the time horizon category 104. The first category score may be the assessment of when the investor desires return on the investor's investments (time constraints). A second category score may correspond to the risk tolerance category 106. The second category score may be the assessment of the degree of risk with which the investor is comfortable (behavioral psychology). A third category score may correspond to the investor's portfolio objective category 108. The third category score may be the assessment of the investor's overall objective for the investor's portfolio, and may also include any other relevant information not applicable to the time horizon category 104 and the risk tolerance category 106. For example, the third category score may be the assessment indicating a purpose for making the investment, an expected return on the investment, concern about inflation, a desire for income generation, a desire for liquidity of the investment, and/or a change in lifestyle. The portfolio objective category 108 may represent decisions about or requirements for the portfolio that the investor has made, such as a decision regarding the expected return and the degree of liquidity. The income generation requirement may be a component of the expected return.

In one example, the portfolio objective category 108 may be assessed as one of multiple assessed types 110, 112, and 114. The category score may be indicative of the assessed type 110, 112, and 114. For example, one assessed type 110, 112, and 114 may be a liquidity and income bucket 110. The liquidity and income bucket 110 may indicate a desire for investments that have a relatively high degree of liquidity and that also generate income. Another assessed type may be an income and growth bucket 112. The income and growth bucket 112 may indicate a desire for investments that generate income, but that also provide growth. Yet another assessed type may be a growth bucket 114. The growth bucket 114 may indicate a desire for investments that primarily provide growth.

Any assessed type may be used that indicates the assessment of the question category 104, 106, and 108. Examples of other assessed types 110, 112, and 114 may include liquidity, income, income and growth, moderate growth, growth, and aggressive growth. More, less, or different assessed types 110, 112, and 114 may be used for any question category 104, 106, and 108.

The overall score 120 may be a function 116 of the assessment in each of the question categories 104, 106, and 108 included in the system 100. In other words, the overall score 120 may be the function 116 of the category scores corresponding to the question categories 104, 106, and 108. Any function of multiple variables may be used as the function 116. Each of the variables of the function 116 may correspond to one of the question categories 104, 106, and 108. For example, the function 116 may be a mapping function that maps each combination of the category scores that correspond to the time horizon category 104, the risk tolerance category 106, and portfolio objective category 108 to the overall score 120. A combination 118 of the category scores may be any group of category scores, where each of the category scores corresponds to a different one of the question categories 104, 106, and 108 than the other category scores. As an example, a combination 118 may be mapped to the overall score 120. More than one combination 118 of the category scores may be mapped to the same overall score 120 in some examples. In some examples, a combination 118 may include the assessed type 110, 112, and 114 instead of the category score for the question category 104, 106, and 108.

FIG. 2 is a portion of an example questionnaire 200 that may be included in the system 100 to model the investment profile of the investor. The questionnaire 200 may include questions 202. Each of the questions 202 may have multiple answers 204 selectable by the user when taking the questionnaire 200. The user may be anyone taking the questionnaire 200, such as the investor or an analyst entering the answers on the investor's behalf. Each of the questions 202 may be directed to one or more question categories 104, 106, and 108. For example, the question categories may include the portfolio objective category 108, the time horizon category 104, and/or the risk tolerance category 106. One question 202 such as "My current age is:" may be directed to the time horizon category 104, for example. In one example, all of the questions 202 included in the questionnaire 200 are directed to one question category 104, 106, and 108. In a different example, some of the questions 202 are directed to one question category, 104, 106, and 108, and other questions 202 are directed to a different question category, 104, 106, and 108. In still another example, one or more of the questions 202 are each directed to one or more of the question categories 104, 106, and 108.

One or more of each of the answers 204 to the question 202 may be associated with an answer value 206. The answer value 206 may be referred to as a weight. Each of the answers 204 may be associated with the answer value 206 corresponding to each of the question categories 104, 106, and 108 to which the question 202 is directed.

The category score may indicate the assessment of the subject matter of the question category 104, 106, and 108. The category score may be a function of the answers 204 provided by the user in response to each of the questions 202 directed to the corresponding question category 104, 106, and 108.

Any function may be used. For example, the category score may be the sum of each of the answer values 206 corresponding to the answers 204 provided by the user in response to the questions 202, where the answer values 206 are associated with questions 202 directed to the corresponding question category 104, 106, and 108. In FIG. 2, if the questionnaire 200 were to include no other questions 202 directed to the risk tolerance category 106, then the category score may be three if answer "C" were selected in response to a second question included in the questionnaire. In a different example, the category score may be a percentage of a maximum category score possible. The percentage may be calculated by determining the sum of each of the answer values 206 corresponding to the answers 204 provided by the user in response to the questions 202, where the answer values 206 are associated with questions 202 directed to the corresponding question category 104, 106, and 108, dividing by the maximum category score possible, and multiplying by 100.

If the question 202 is not a multiple-choice or true-false, the answer value 206 may be determined from the answer manually entered. For example, in response to the question such as, "How many years old are you?", the user may manually enter a numerical value. The answer may be used as the answer value 206, or the answer value 206 may be the function of the answer manually entered.

One or more of the questions 202 may be un-scored. The question 202 that does not have the answer value 206 either associated with or as the function of the answer 204 may be considered an un-scored question 202. For example, an open-ended question 202 such as "What lifestyle changes, if any, do you anticipate in the near future?" may be an un-scored, question 202. An open-ended question 202 may be a question in a form that may not be answered with a "yes/no" or with a selection from some other predetermined set of possible answers 204. Questions not answered by the user who takes the questionnaire 200 may also be considered un-scored questions.

Each question may be identified with a question identifier 208. The question identifier 208 may be any number, character, symbol, or combination thereof.

The question category 104, 106, and 108 may be further subdivided into subcategories. For example, the portfolio objective category 108 may be subdivided into subcategories, such as fund purpose subcategory, investment objective subcategory, expected return subcategory, inflation concern subcategory, expected income subcategory, expected liquidity subcategory, and possible lifestyle changes subcategory.

The expected return subcategory may be indicative of a desired return on the investor's investment. The expected income subcategory may be indicative of the investor's desire to receive a minimum level of income from the portfolio. The expected liquidity subcategory may be indicative of a desire of the investor for a degree of liquidity in the portfolio. The investment objective subcategory may be indicative of the investor's reason or reasons to invest in the portfolio. The inflation concern subcategory may be indicative of a concern of the investor about inflation.

Figure 3:
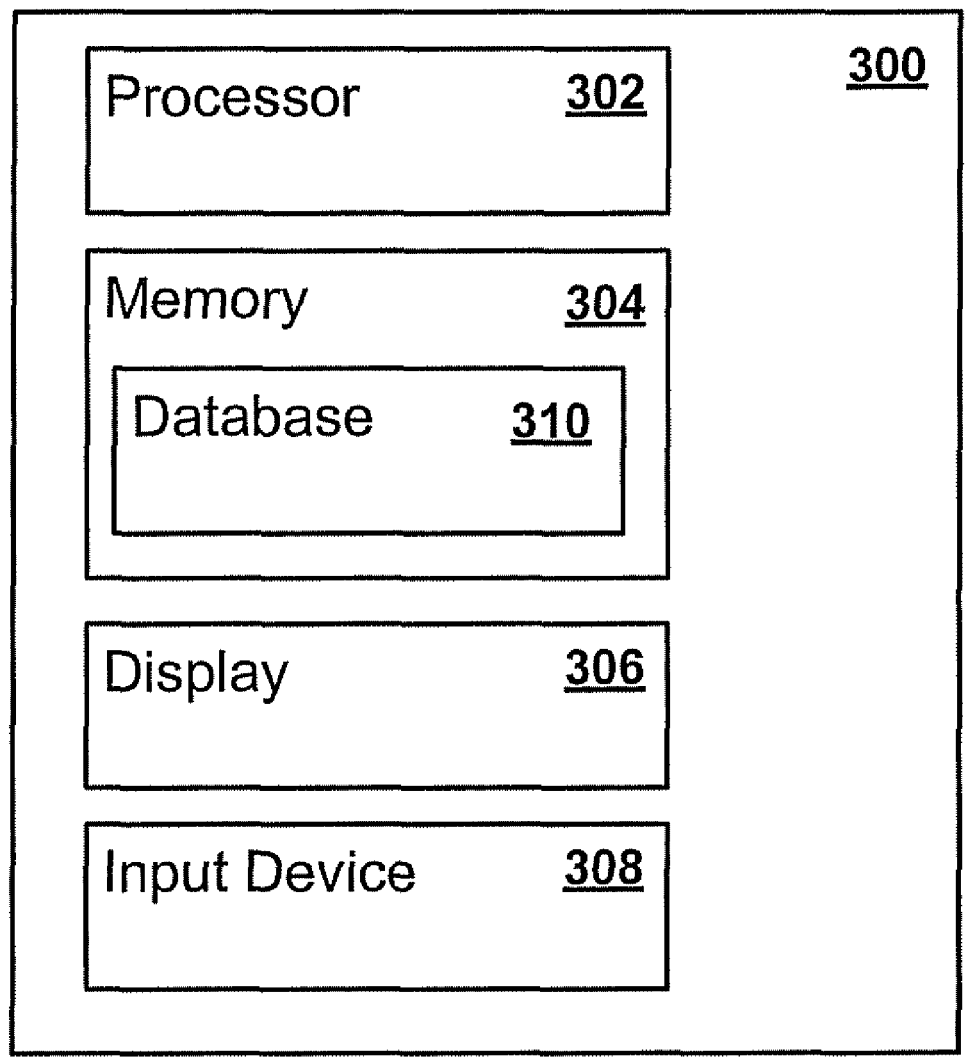
FIG. 3 is an example of a system to deliver, develop, or normalize one or more questionnaires.

FIG. 3 is an example of a system 300 to deliver, develop, or normalize one or more questionnaires. The system 300 may include a processor 302, a memory 304, a display 306, an input device 308, and a database 310. The system 300 may include additional, different, or fewer components. For example, the system 300 may include a network over which the processor 302 communicates with the database 310.

The processor 302 may be in communication with the memory 304. The processor may also be in communication with additional components, such as the display 306, the input device 308, and the database 310. The processor 302 may be a general processor, central processing unit, server, application specific integrated circuit (ASIC), digital signal processor, field programmable gate array (FPGA), digital circuit, analog circuit, or combinations thereof. The processor 302 may be one or more devices operable to execute computer executable code to deliver, develop, and/or normalize one or more questionnaires 200.

The memory 304 may be any now known, or later discovered, data storage device. The memory 304 may be a non-volatile and/or volatile memory, such as a random access memory (RAM), a read-only memory (ROM), an erasable programmable read-only memory (EPROM), or flash memory. The memory 304 may include an optical, magnetic (hard-drive) or any other form of data storage device.

The display 306 may be any electro-optical device for displaying data, such as a liquid crystal display (LCD), a cathode ray tube (CRT), an electro-luminescent display, a plasma display panel (PDP), a vacuum florescent display (VFD), or any other display device. The input device 308 may be any electro-mechanical device, electro-optical device, or any other type of device, now known or later discovered that is configured to convert user inputs into electrical signals such as a mouse, joystick, trackball, camera, keyboard, keypad, wireless device, microphone for voice commands, or touch-screen display.

The database 310 may be included in a memory, such as in the memory 304 in the system 300, where any electronic collection of information is stored in the memory. For example, the database 310 may include information organized so that the information may be accessed, managed, and updated. For example, the database 310 may be a Relational Database Management System (RDBMS), an object-oriented database, an extensible markup language (XML) database, a file system, memory structures, or other now known or later developed data organization and storage mechanism. The database 310 may use any type of memory and structure, such as a random access memory (RAM), a read-only memory (ROM), an erasable programmable read-only memory (EPROM), flash memory, optical memory, magnetic (hard-drive or tape) memory or other memory device.

The memory 304 of system 300 may include computer executable code. The computer code may include instructions executable with the processor. The computer code may include logic embedded in the instructions. The computer code may be written in any computer language now known or later discovered, such as C++, C#, Java, Pascal, Visual Basic, Perl, HyperText Markup Language (HTML), JavaScript, assembly language, and any combination thereof.

The memory 304 may also include system data. For example, the system data may include one or more questionnaires 200 and one or more investment profiles of investors.

In one example, the system 300 in FIG. 3 may deliver one or more questionnaires 200. To deliver the questionnaire 200, the processor 302 may receive answers 204 selected in response to questions 202 in order to determine the investment profile of the investor. For example, the processor 302 may generate an image of the questions 202 included in the questionnaire 200. The display 306 may display the image of the questions 202. The processor 302 may receive selection signals generated by the input device 308. Each of the selection signals may indicate that the user has selected one of the possible answers 204 to one of the questions 202. After and/or while receiving the selection signals, the processor 302 may calculate each of the category scores corresponding to each of the question categories 104, 106, and 108. The processor 302 may additionally calculate the overall score 120 from the category scores. The investment profile may include the category score for each of the question categories 104, 106, and 108 and/or include the overall score 120.

In one example, the processor 302 may match product offerings stored in the database 310 with the investment profile of the investor. A product offering may include, for example, any purchasable investment asset, such as stocks, bonds, real estate, insurance policies, and money markets. Each of the product offerings may include a corresponding product profile that reflects the assessment of the product offering. The processor 302 may match the product profile of the product offering with the investment profile of the investor using any technique for searching in a database, such as with a SQL (Structured Query Language) query. For example, the SQL query may locate product offerings having category scores within a certain range of the category scores of the investment profile of the investor. In another example, category scores included in each of the product profiles may be retrieved as coordinates of a point in a Cartesian coordinate system. The category scores included in the investment profile of the investor may be coordinates of another point in the same Cartesian coordinate system. The processor 302 may calculate the distances between the points corresponding to the product profiles and the point corresponding to the investment profile. The processor 302 may determine product offerings having coordinates within a determined distance of the point corresponding to the investment profile as matches.

It is to be appreciated that the questionnaire 200 may be used in an automated system to determine an assessment of any kind based on answers 204 provided in response to questions 202 included in the questionnaire 200. Examples of the assessment include but are not limited to investment preferences of the investor, personality traits of the employee, and purchasing behaviors of a consumer. Additionally, question categories 104, 106, and 108 may be any topic relevant to the subject matter of the questionnaire 200. Among others, determination of answer values 206 corresponding to answers 204 to questions 202 may initially involve a subjective analysis by a subject matter expert. Thereafter, however, determination of the assessment based on answers 204 provided in response to the questionnaire 200 may be automated by determining category scores based on the answer values 206 provided by the subject matter expert.

Assessed types 110, 112, and 114, may be any grouping of assessments of the question category. The category score may be indicative of an assessed type 110, 112, and 114. The assessed types of liquidity and income bucket 110, income and growth bucket 112, and growth bucket 114 are examples of assessed types of the portfolio objective category 108. In a different example, assessed types 110, 112 and 114 corresponding to the question category of "personality" may include "extrovert" and "introvert."

Determination of assessed types 110, 112 and 114 based on the category score may also be automated. For example, the memory 304 may include a value range corresponding to each of the assessed types 110, 112 and 114. The value range may include a range of category scores to which the assessed type 110, 112 and 114 applies. The processor 302 may determine which assessed type 110, 112, and 114 applies based on whether the category score, which was determined as the function of answer values 206, falls within the value range associated with the assessed type. For example, the value range of zero percent to 30 percent may be associated with the growth bucket 114. The value range of 30 percent to 60 percent may be associated with the income and growth bucket 112. The value range of 60 percent to 100 percent may be associated with the liquidity and income bucket 110. If, for example, the processor 302 determined the category score to be 29 percent, the processor may determine the assessed type to be the growth bucket 114.

In addition to the processor 302 determining the assessment based on answers 204 provided in response to scored questions 202, the processor 302 may permit the user to modify the determined assessment based on answers 204 provided in response to un-scored questions 202. For example, the processor 302 may receive answers 204 provided in response to un-scored questions 202. Such answers 204 may be displayed in the display 306 in addition to or instead of elements included in the assessment, such as category scores and the overall score 120. The processor 302 may receive a signal from the input device 308 that indicates a manual modification of the overall score 120. Thus, the user may modify the overall score 120 based on answers 204 provided to un-scored questions 202. For example, a financial analyst might increase the overall score 120 if the answer 204 provided to the un-scored question 202 indicated that the investor just won the lottery.

Although the example system 300 included in FIG. 3 is the automated system 300 to deliver, develop, or normalize one or more questionnaires, the manual system 300 may also be used to deliver, develop, or normalize one or more questionnaires. The manual system may include paper and a pencil. For example, the questionnaire 200 may be included on the paper and be used to determine the assessment based on answers 204 provided in response to questions 202 included in the questionnaire 200. The answer values 206 may be tallied manually, and the category scores manually calculated. The assessed type, for example, may manually be looked up based on the corresponding category score. In still other examples, the system 300 may be both automated in part and manual in part. For example, a spreadsheet program, such as Microsoft Excel® from Microsoft Corporation of Washington, may be used to tally the answer values 206 and calculate the scores, based on answers 204 manually entered into cells of a spreadsheet.

In addition to or instead of delivering one or more questionnaires 200, the system 300 such as the one in illustrated in FIG. 3, may be used to develop one or more questionnaires. In some examples, two or more questionnaires 200 may be used to make assessments of the same subject matter. Each of the questionnaires 200 may have entirely different questions 202, similar questions 202, and/or the same questions 202 as one or more of the other questionnaires. For example, different business units within a company may all desire to determine the investment profile of each of their customers who are investors. However, different business units may offer different kinds of investments to their respective customers. Thus, each of the business units may have a corresponding questionnaire 200 with questions focusing on the kinds of investments in which each of their respective customers are typically interested.

Using a common assessment scale for each one of the questionnaires may be desirable. For example, each of the different kinds of investments sold by the same company may be assessed using the common assessment scale. In such examples, it may be desirable to determine a consistent assessment from answers 204 provided in response to questions 202 regardless of which of the questionnaires 200 are used.

Figure 4:
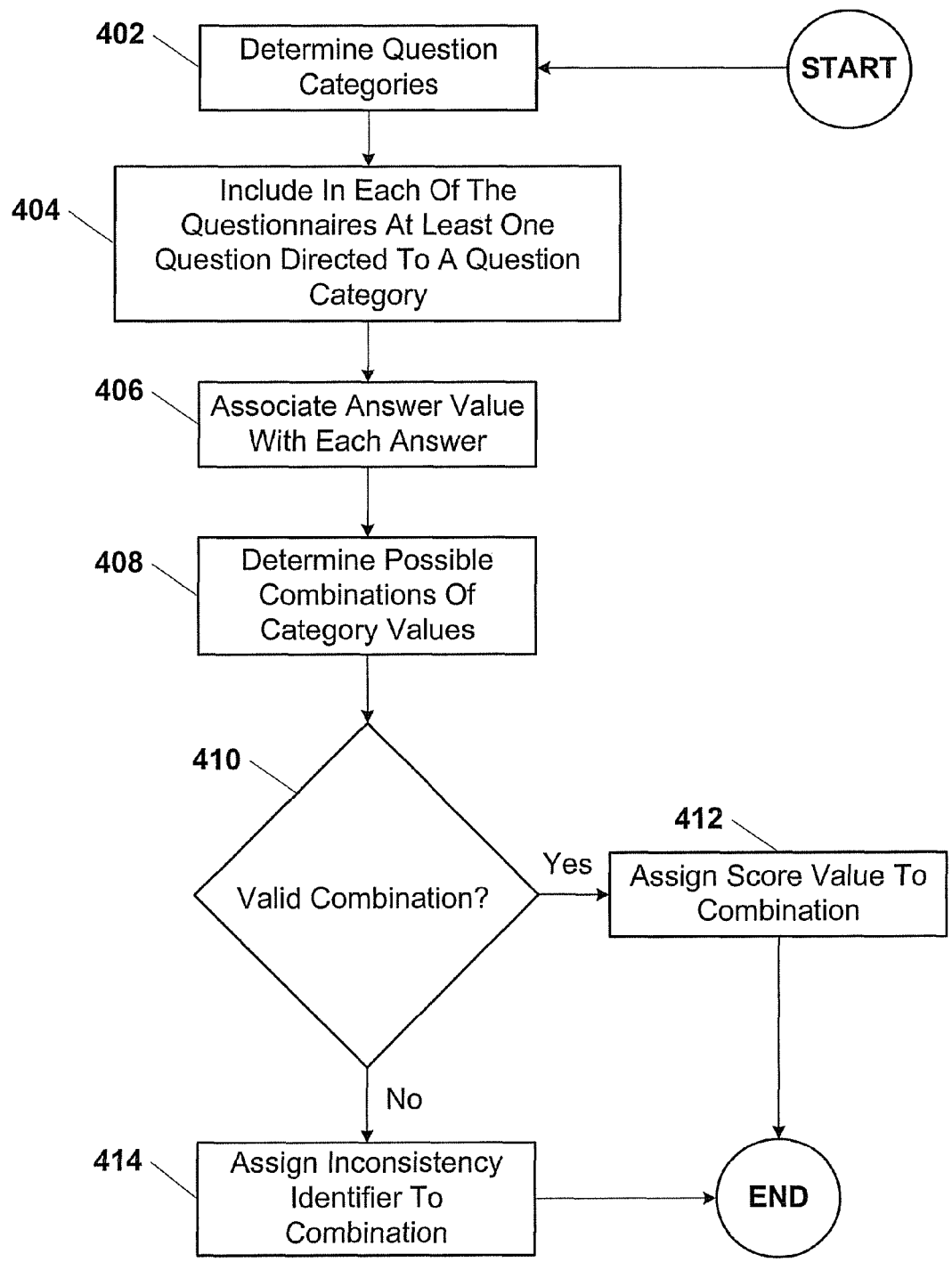
FIG. 4 illustrates one example of a flow diagram of a method to develop multiple questionnaires.

FIG. 4 illustrates one example of a flow diagram of a method to develop multiple questionnaires 200 to make a consistent assessment based on answers 204 provided in response to questions 202, where the questions 202 are included in each respective one of the questionnaires 200. Additional, different, or fewer acts may be performed. The acts do not need to be performed in the order shown in FIG. 4.

In act 402 of the example illustrated in FIG. 4, the method may begin by determining one or more question categories, 104, 106, and 108, to which questions 202 included in each of the questionnaires 200 are directed. For example, the question 202 "What percentage return on your investment are you expecting to receive?" may be directed to the portfolio objective category 108. In another example, the question "What is your annual personal income before tax?" may be directed to the risk tolerance category 106. An individual with a higher personal income may be considered to have a higher category score for the risk tolerance category 106 than another individual who has a lower personal income. In some examples, the questions 202 may be provided prior to determining the question categories 104, 106, and 108. In other examples, the questions 202 may be provided after determining the question categories 104, 106, and 108. In still other examples, the question categories 104, 106, and 108 may be provided.

In act 404, the method may continue by including in each of the questionnaires 200 at least one question 202 directed to the question category 104, 106, and 108. In some examples, the method may continue by including at least one question 202 directed to each of the question categories 104, 106, and 108.

In act 406, the method may continue by associating the answer value 206 with each of the possible answers 204 to each respective one of the questions 202. In the automated system, the answer value 206 may be selected based on a value entered or otherwise selected by the user developing the questionnaires.

In act 408, the method may further continue by determining possible combinations of category scores. As discussed above, category scores may be determined as the function of answers 204 provided in response to questions 202. Thus, depending on the answers 204 selected by the user taking a particular questionnaire 200, each of the category scores may be determined to be a number within a range of values. Each of the question categories 104, 106, and 108 may have corresponding ranges of category scores. Determining the possible combinations of the category scores may also include determining the maximum and minimum possible category scores for each corresponding question category 104, 106, and 108 in order to determine the ranges of category scores.

For example, in Table 1 below, each of the columns may represent the range of possible category scores corresponding to a first question category. In the example illustrated in Table 1, the minimum possible value of the first category score is zero percent. The maximum possible value of the first category score is 100 percent. Each of the rows may represent a range of possible category scores corresponding to a second question category. The minimum possible value of the second category score is zero. The maximum possible value of the second category is 10. Thus, each cell in Table 1 corresponds to one or more possible combinations of the first category score and the second category score. In other examples, each of the columns and/or rows may correspond to one category score instead of the range of category scores. Table 1 illustrates an example that includes two question categories. An example that includes three question categories is described below in reference to FIG. 9. However, possible combinations of category scores may be determined for any number of question categories.

TABLE 1

| Second Category Score | First Category Score | | | |
|---|---|---|---|---|
| | 0% | 25% | 50% | 75% |
| 0-1 | N/A | N/A | 3 | 4 |
| 2-3 | N/A | 2 | 3 | 4 |
| 4-5 | 2 | 2 | 3 | 4 |
| 6-7 | 3 | 3 | 3 | 5 |
| 9-10 | 4 | 4 | 5 | 5 |

In act 410, the method may proceed by checking whether each of the possible combinations of the category scores is valid. A possible combination may be valid if the possible combination indicates questions 202 directed to different question categories 104, 106, and 108 were answered consistently. For example, if the first category were risk tolerance category 106 and the second category were portfolio objective category 108, it may be inconsistent for the investor to demand high growth and yet have a low risk tolerance. If the possible combination is valid, then the method may continue in act 412 by assigning the overall score 120 to the possible combination. In the example illustrated in Table 1, the overall score 120 could be 2, 3, 4, or 5. Alternatively, if the possible combination is invalid, then the method may continue in act 414 by assigning an inconsistency identifier to the possible combination. The inconsistency identifier may be any identifier to indicate that the possible combination is not valid due to an inconsistency in the answers 204 provided. Examples of the inconsistency identifier include "N/A," "No," "Not Applicable," "X," "nil," and/or "null."

The system 300 such as the example in FIG. 3 may determine inconsistencies from combinations of category scores. If the inconsistency identifier is assigned to the possible combination matching the category scores determined when delivering the questionnaire 200, the system 300 may notify the user of the system that one or more of the questions 204 were inconsistently answered.

Determining the function 116 to determine the overall score 120 based on category scores 104, 106, and 108 and/or assessed types 108, 110, and 112 may include constructing a table such as the example in Table 1. Determining overall scores 120 included in the table may include determining which combinations of category scores should map to the inconsistency identifier. In some examples, a subject matter expert may make the determination. Determining overall scores 120 included in the table may additionally or alternatively include filling in each of the fields of the table with an applicable overall score 120.

Developing multiple questionnaires 200 to make a consistent assessment based on answers 204 provided in response to questions 202 may involve normalizing the questionnaires 200. Normalizing the questionnaires 200 may include adjusting one or more of the questionnaires such that each of the questionnaires conforms to a common assessment scale. The following description of normalizing the questionnaires 200 refers to FIGS. 5-11.

FIG. 5 illustrates an example of an outline 500 of multiple questionnaires 200. An outline 500 may optionally be used to test and normalize the questionnaires 200. The outline 500 may include the question categories 104, 106, and 108. The outline 500 may also include subcategories 502 of one or more of the question categories. The outline 500 may include a row in a grid for each of the subcategories 502 and/or question categories 104, 106, and 108. The outline 500 may include a questionnaire identifier 504 for each of the questionnaires 200. The questionnaire identifier 504 may be any word, phrase, and/or symbol that may identify the questionnaire 200 and be included in a column in the grid corresponding to each of the questionnaires 200.

The outline 500 may also include the question identifier 208 for each of the questions 202 included in the questionnaire 200. The question identifier 208 may be included in the column corresponding to the questionnaire 200. In other words, the question identifiers 208 corresponding to questions 202 included in each respective one of the questionnaires 200 may be grouped into a group corresponding to the respective one of the questionnaires 200. Furthermore, the question identifier 208 may also be positioned in the row corresponding to the question category/subcategory to which the question 202 identified by the question identifier 208 is directed. In other words, question identifiers 208 included in each of the groups may be grouped into subgroups, where each of the subgroups corresponds to a respective one of the question categories or subcategories. Thus, the question common to two or more questionnaires 200 may be positioned in the same row of the grid.

The outline 500 may include a column 506 containing the question identifier 208 corresponding to each of the questions 202 common to all of the questionnaires 200. Because questions common to two or more questionnaires 200 may be positioned on the same row of the grid, determining the questions common to all of the questionnaires 200 is straightforward. Each of the distinct questions 202 directed to one of the question categories 104, 106, and 108 may be determined by determining which of the question identifiers are in the row corresponding to the particular question category.

Un-scored questions may be specifically designated as such by highlighting, bolding, or using some other distinguishing visual indication. Different versions of substantially the same question may be designated as different versions. For example, a version number of the question such as "(V1)" may be positioned adjacent to the question identifier 208.

Normalizing the questionnaires 200 may include verifying that the category score is consistently determined regardless of which of the questionnaires 200 is used. Verifying that the category score is consistently determined may include identifying distinct questions 202 directed to one of the question categories 104, 106, and 108 and included in at least one of the questionnaires 200. For the purposes of this disclosure, "distinct questions" 202 are defined as questions 202 that are different from each other. Verifying that the category score is consistently determined may also include selecting one or more focus questions 202 from the distinct questions 202 directed to the question category 104, 106, and 108. For the purposes of this disclosure, "focus questions" 202 are defined as questions 202 included in the distinct questions 202. As described later, verifying that the category score is consistently determined may additionally include analyzing multiple sample scenarios as applied to the focus questions 202.

FIG. 6 illustrates an example of distinct questions 202 directed to the question category 104, 106, and 108. In FIG. 6, a grid includes a column for each of the distinct questions 202 directed to a portfolio objective category 108. The grid also includes a row for each of the possible answers 204 to each respective one of the distinct questions 202. The answer value 206 assigned to each corresponding answer 204 and distinct question 202 is placed in a cell in the grid. If two or more questions 202 are different versions of the same question 202 and the answer values 206 assigned to each of the answers 204 are the same for those questions 202, then the questions may share the same column. For example, across all of the questionnaires 200 identified in FIG. 5, the distinct questions 202 directed to the portfolio objective category 108 are 4A, 4B, 4C, 4D, 5A, 5B, 5C, 5D, and 5E. Un-scored questions 202, which do not have the answer value 206 either associated with or as the function of the answer 204 of the question 202, may be excluded from further consideration when normalizing the questionnaires 200. For example, although not indicated as such in FIG. 5, questions 202 1A, 5C, 7A, 2A and 9A are un-scored questions 202. Because the answer values 206 assigned to each of the questions 5B and 5E are the same, the questions 5B and 5E may share the column in the grid.

Verifying that the category score is consistently determined across multiple questionnaires 200 may additionally include analyzing multiple sample scenarios as applied to the focus questions 202. Category scores may be determined for the sample scenarios and compared to each other.

FIG. 7 illustrates an example analysis of focus questions 702 and 704 as applied to sample scenarios 706. A column in a grid may correspond to each of the focus questions 702 and 704. Any method of selecting a subset of a group from the group may be used to select the focus questions 702 and 704 from the distinct questions 200. For example, the focus questions may be randomly selected, selected to include questions common to all of the questionnaires 200, and/or sequentially selected from a list of the questions. For example, the focus questions 702 and 704 may be all of the questions that are included in a determined question category 104, 106, and 108 for a determined set of questionnaires 200. In a different example, the focus questions 702 and 704 may include all of the questions 202 directed to the question category 104, 106, and 108 and/or the question subcategory for all of the questionnaires 200. In FIG. 7, the focus questions 702 and 704 are question 4A and question 4C, respectively. In the example illustrated in FIG. 5, question 4A and question 4C are the two questions directed to the portfolio objective category 108 that are common to all of the questionnaires 200.

Analyzing multiple sample scenarios 706 may further include determining multiple scenario types 707. A scenario type 707 describes a set of scenarios having common characteristics. For example, a common characteristic may be a shared common assessment. In one example, each of the scenario types 707 may be the assessment in the question category 104, 106, and 108, of which the category score may be indicative. In a different example, each of the scenario types 707 may be the overall assessment of which the overall score 120 may be indicative. Increasing the number of scenario types 707 may provide more accuracy in the analysis in some examples. The focus questions 702 and 704 in FIG. 7 are directed to the portfolio objective category 108. Each of the scenario types 707 in FIG. 7 describes a set of scenarios that are expected to share a common overall profile 102.

The scenario types 707 may be ordered, for example, from an expected lower corresponding category score to an expected higher corresponding category score. For example, in FIG. 7, the scenario types 707 are ordered from "Safety" to "Max Equity Growth" The category score corresponding to "Safety" in the portfolio objective category should be smaller than a category score corresponding to "Max Equity Growth" in the portfolio objective category. In another example, any order may be chosen, such as from a higher corresponding category score to a lower corresponding category score. In still other examples, the scenario types 707 may be unordered.

Analyzing multiple sample scenarios 706 may additionally include determining answers 204 applicable to the scenario type 707 for each of the corresponding focus questions 702 and 704. In some examples, a subject matter expert may determine which answers 204 are applicable to the scenario type 707. In one example, only a subset of the answers 204 applicable to the scenario type 707 may be selected. In another example, all answers 204 applicable to the scenario type 707 may be selected. Different permutations of the answers 204 determined to be applicable to the scenario type 707 may be included in the applicable answers 204. For example, in FIG. 7, answers 204 "C" and "D" to the first focus question 702 (question 4A) are determined to be applicable to the scenario type 707 "Balanced Growth." Similarly, answers "B" and "C" to a second focus question 704 (question 4C) are determined to be applicable to the scenario type 707 "Balanced Growth." Accordingly, the four permutations of the applicable answers 204 may be the samples scenarios 706 under the scenario type 707 "Balanced Growth" illustrated in FIG. 7.

Additionally, analyzing multiple sample scenarios 706 may include determining answers 204 applicable to the other scenario types 707 and determining the different permutations of those answers 204 in order to determine the sample scenarios 706 for the focus questions 702 and 704.

Each of the answers 204 in each of the sample scenarios 706 may be associated with the corresponding answer value 206. The corresponding answer values 206 may be placed in a first column 708 and a second column 710 that correspond to each of the respective focus questions 702 and 704. The category score 712 and 714 may be determined as the function of each of the answer values 206 included in each of the sample scenarios 706 instead of as the function of the answers 204 provided in response to every question included in the questionnaire 200 directed to the question category 104, 106, and 108 except un-scored questions. The first category score 712 may be expressed, for example, as a raw score. The second category score 714 may be expressed as a percentage of a maximum total category score. In other examples, only one category score 712 and 714 may determined and included in the grid.

Figure 8:
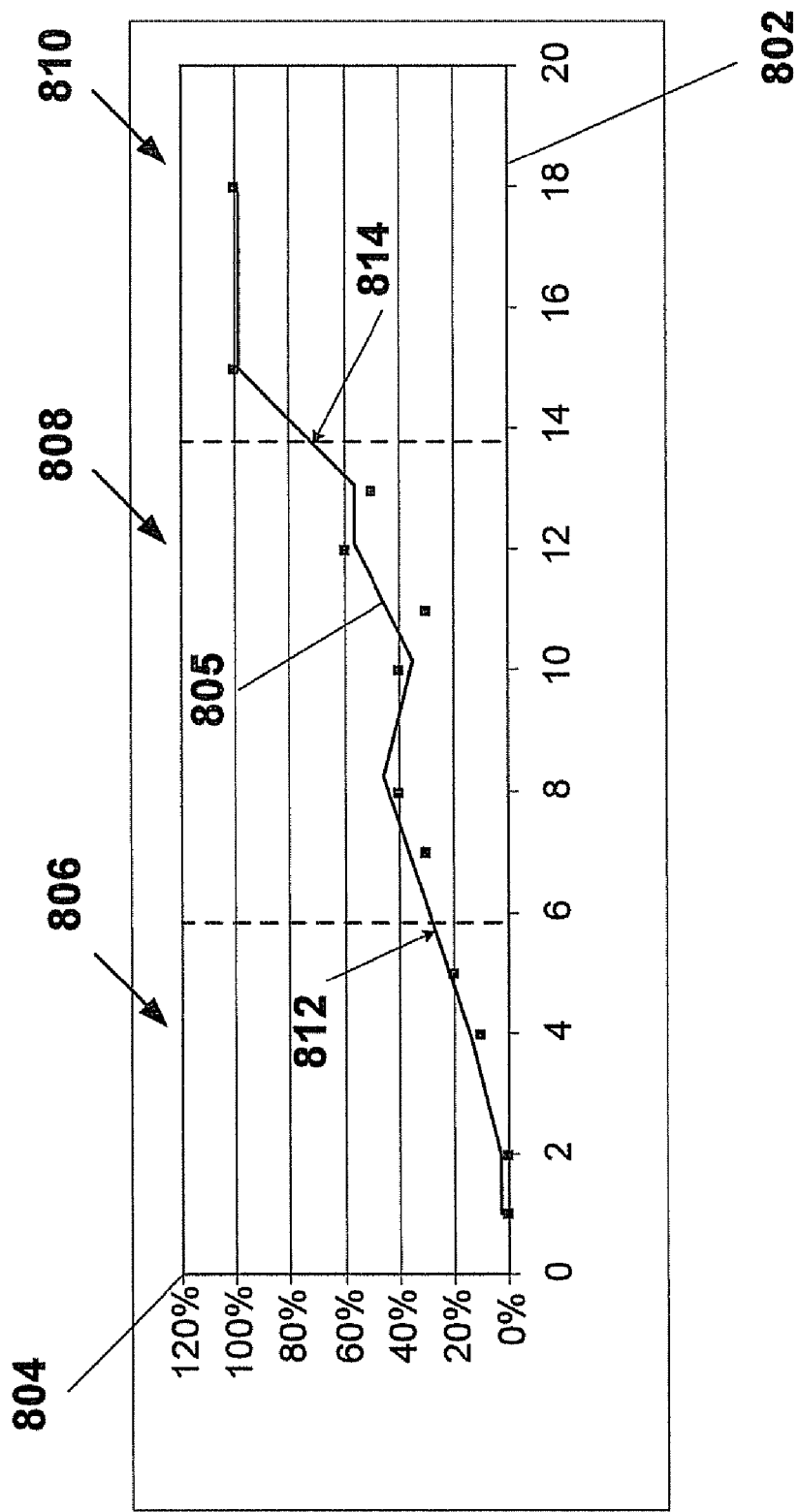
FIG. 8 illustrates an example graph of the percentage of category scores determined for each of the sample scenarios versus the sample scenarios from the example analysis illustrated in FIG. 7.

FIG. 8 illustrates an example graph of the percentage of category scores 714 determined for each of the sample scenarios 706 versus the sample scenarios 706 from the example analysis illustrated in FIG. 7. Because the scenario types 707 were ordered from a lower expected category score to a higher expected category score, the graph may be expected to be substantially linear with a positive slope. Furthermore, the graph may be expected not to contain any relatively large gap between data points along a horizontal axis 802 and no substantial gap between data points along a vertical axis 804. However, if there are such gaps, one or more of the questionnaires 200 may be adjusted. For example, the answer values 206 associated with answers 204 included in the sample scenario 706 corresponding to a point may be adjusted to eliminate the gaps.

Normalizing the questionnaires 200 may also include verifying that the assessed type is consistently determined based on the corresponding category score. In such examples, the assessment may include the assessed type 110, 112, and 114 corresponding to the category score. In the example of FIG. 1, the assessment includes the assessed type of a "Growth Bucket" 114, an "Income and Growth Bucket" 112, and a "Liquidity and Income Bucket" 110 corresponding to the portfolio objective category 108. As previously discussed, each of the assessed types 110, 112, and 114 may have the corresponding value range. A union of the value ranges may be the range of possible category scores for the question category. For example, a value range of zero percent to 30 percent may be associated with the "Growth Bucket" 114. A value range of 30 percent to 60 percent may be associated with the "Income and Growth Bucket" 112. A value range of 60 percent to 100 percent may be associated with the "Liquidity and Income Bucket" 110. The union of the value ranges is zero to 100 percent, which is the range of possible category scores in this example.

A threshold category score may be a determined category score where any category score lower than the determined category score corresponds to one set of assessed types 110, 112, and 114, and any category score greater than the determined category score corresponds to a different set of assessed types 110, 112, and 114. In the example above, 30 percent and 60 percent are threshold category scores.

Verifying that the assessed type is consistently determined based on the corresponding category score may include determining the threshold category scores for one or more question categories 104, 106, and 108. The threshold category scores may be determined from an analysis of the category scores 712 and 714 determined from the example scenarios 706. For example, category scores 712 and 714 corresponding to the example scenarios may be graphed versus the respective example scenarios, such as in FIG. 8. Each point on the graph may correspond to the category score 712 or 714 and the example scenario 706. A curve 805 may be drawn to connect consecutive points on the graph. In other examples, any graph that displays a relationship between the category scores, 712 and 714, and the corresponding example scenarios may be used. Any curve fitting algorithm may be used to fit the curve 805 to the points on the graph. An axis 802 corresponding to the sample scenarios 706 may be divided into segments 806, 808, and 810, where each of the segments corresponds to a respective one of the assessed types 110, 112, and 114. Where one segment 806, 808, and 810 ends and another begins, a threshold point 812 and 814 may be determined based on the curve 805. The threshold category score may be determined as the category score at the threshold point. The threshold points may be approximations and may, therefore, be adjusted.

After analyzing multiple sample scenarios 706 as applied to the focus questions 702 and 704, the same process of analyzing multiple sample scenarios 706 may be performed on a different set of focus questions. Using focus questions 702 and 704 may limit the analysis to a relatively small number of scenarios 706 at a time. Additionally, the separate focus on each of the question categories 104, 106, and 108 may also limit the number of example scenarios 706 analyzed at one time.

There may be one set of threshold category scores that apply to each different set of the focus questions 702 and 704. If not, then appropriate answer values 206 may be modified so that there is one set of threshold category scores that applies to each set of the focus questions 702 and 704. Alternatively or in addition, the threshold category scores may be adjusted so that there is one set of threshold category scores that applies to each set of the focus questions 702 and 704.

For each of the scenario types 707, permutations of each of the answers 204 included in the sample scenarios 706 for each of the different sets of focus questions 702 and 704 may be combined to form a superset of sample scenarios 706. The category scores 712 and 714 may be determined for each of the sample scenarios 706 included in the superset. The one or more category scores 712 and 714 determined for each of the sample scenarios 706 in the superset may be graphed against the sample scenarios 706 and analyzed for consistency. Accordingly, adjustments to answer values 206 may be made.

In addition to or instead of delivering and/or developing one or more questionnaires 200, the system 300 such as the one illustrated in FIG. 3, may be used to normalize the questionnaires 200, as previously discussed. For example, the processor 302 may generate an image of a graph of category scores 714 versus sample scenarios 706 as illustrated in FIG. 8. The processor 302 may receive a selection signal from the input device 308 where the selection signal is indicative of the user modifying the answer value 206 of one of the distinct questions 202. Upon receipt of the selection signal, the processor 302 may recalculate the category scores 714 and regenerate the image of the graph. Alternatively, a manual system may be used to normalize the one or more questionnaires 200. In some examples, normalizing the questions may include both manual and automated acts.

As discussed above, normalizing the questionnaires 200 may include verifying that the assessed type 110, 112, and 114 and/or the category score is consistently determined. Normalizing the questionnaires 200 may also include verifying that the overall score 120 is consistently determined regardless of the questionnaire 200 used. As also discussed above, the overall score 120 may be the function 116 of the category scores included in the assessment.

Figure 9:
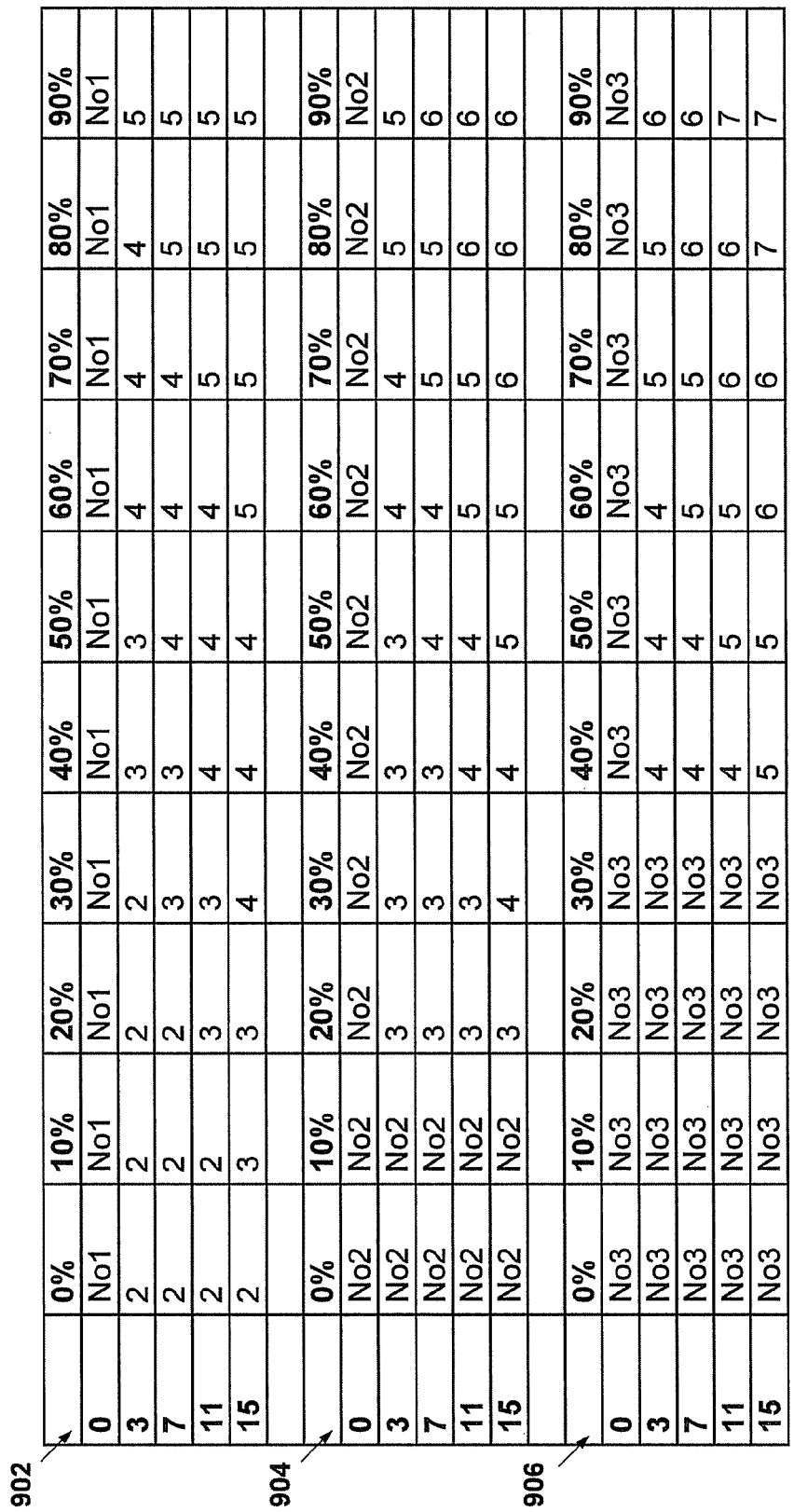
FIG. 9 illustrates an example of a matrix to determine an overall score from both category scores and an assessed type.

FIG. 9 illustrates an example of a matrix to determine the overall score 120 from both category scores and the assessed type 110, 112, and 114 included in the assessment. In FIG. 9, the assessment may be the investment profile of the investor. The matrix may include three different sub-matrices 902, 904, and 906. Each of the sub-matrices 902, 904, and 906 correspond to the assessed type 110, 112, and 114. For example, the first sub-matrix 902 corresponds to the assessed type 110 of "Liquidity and Income Bucket." The second sub-matrix 904 corresponds to the assessed type 112 of "Income and Growth Bucket." The third sub-matrix 906 corresponds to the assessed type 114 of "Growth Bucket" In each of the sub-matrices 902, 904, and 906, each of the columns corresponds to the value range of category scores that in turn correspond to risk tolerance category 106. In each of the sub-matrices 902, 904, and 906, each of the rows corresponds to the category score that in turn corresponds to the time horizon category 106. Each cell in the sub-matrix 902, 904, and 906 may include the overall score 120 or an inconsistency indicator or identifier.

The matrix in FIG. 9, therefore, provides an example function to determine the overall score 120. First, the appropriate sub-matrix 902, 904, and 906 may be determined based on the assessed type 110, 112, and 114 included in the assessment. Second, the appropriate cell within the sub-matrix 902, 904, and 906 may be determined based on the two category scores included in the assessment. Third, the overall score 120 may be obtained from the cell. For example, if the assessment were to include the assessed type 114 of "Growth Bucket," a category score of 50 percent corresponding to the risk tolerance category 106, and a category score of nine corresponding to the time horizon category 104, then the overall score 120 would be four. The "No1," "NO2," and "NO3" entries in the cells may be inconsistency identifiers.

In other examples, any number of matrices, such as the one in FIG. 9, may be used where four or more question categories 104, 106, and 108 are included in the assessment. Each of the matrices may include sub-matrices 902, 904, and 906. Each of the matrices may correspond to the assessed type 110, 112, and 114, and/or the value range of the category score.

Verifying that the overall score 120 is consistently determined regardless of the questionnaire 200 used may include analyzing overall scores 120 determined as the function 116 of sample scenarios 706. The sample scenarios 706 determined for focus questions 702 and 704 that are directed to specific question categories 104, 106, and 108 may be combined to generate a superset of sample scenarios 706. Thus, the superset of sample scenarios 706 may include answers from questions 202 directed to multiple question categories 104, 106, and 108. For example, the scenario types 707 may be the same for each of the question categories 104. In such examples, answers 204 included in the scenario type 707 and included in any one of the question categories 104 may be combined with other answers. Permutations of the combined answers 204 may form the sample scenarios 706 included in the superset of sample scenarios 706 that are applicable to the scenario type 707. Similarly, answers 204 included in the other scenario types 707 may be combined to form the sample scenarios 706 included in the superset of sample scenarios 706 that are applicable to the other scenario types 707. The overall score 120 may be determined for each of the sample scenarios 706 included in the superset of sample scenarios.

For each of the sample scenarios 706, verifying that the overall score 120 is consistently determined may include determining each of the category values 712 and 714 as the function of the answers 204 included in the sample scenario 706. If the overall score 120 is the function 116 of the assessed type 110, 112, and 114 for the question category 104, 106, and 108, then the assessed type 110, 112, 114 may also be determined in order to determine the overall score 120. For each of the sample scenarios 706 in the superset, the overall score 120 may be determined as the function of the answers 204 included in the sample scenario 706.

The overall scores 120 determined for sample scenarios 706 included in the scenario type 707 may be indicative of the scenario type. If not, then one or more of the questionnaires 200 may be adjusted. If the overall scores 120 are determined to be inconsistency indicators, then one or more of the questionnaires 200 may also be adjusted. For example, one or more of the threshold category scores may be too low or high. One or more of the answer values used to determine the overall scores 120 for a problematic sample scenario 706 may be adjusted. The function determining the overall scores 120 may, additionally or alternatively, be adjusted. For example, the overall scores 120 and/or the inconsistency indicators in the cells of the matrix illustrated in FIG. 9 may be modified to yield a desired overall score 120.

In some examples, the overall scores 120 corresponding to each of the sample scenarios 706 may be analyzed in the aggregate. Depending on the type of assessment, the overall scores 120 on the average may exhibit a bias. For example, if the type of assessment is the investment profile of the investor, the overall scores 120 may exhibit a normal distribution with a bias to a particular overall score 120.

Figure 10:
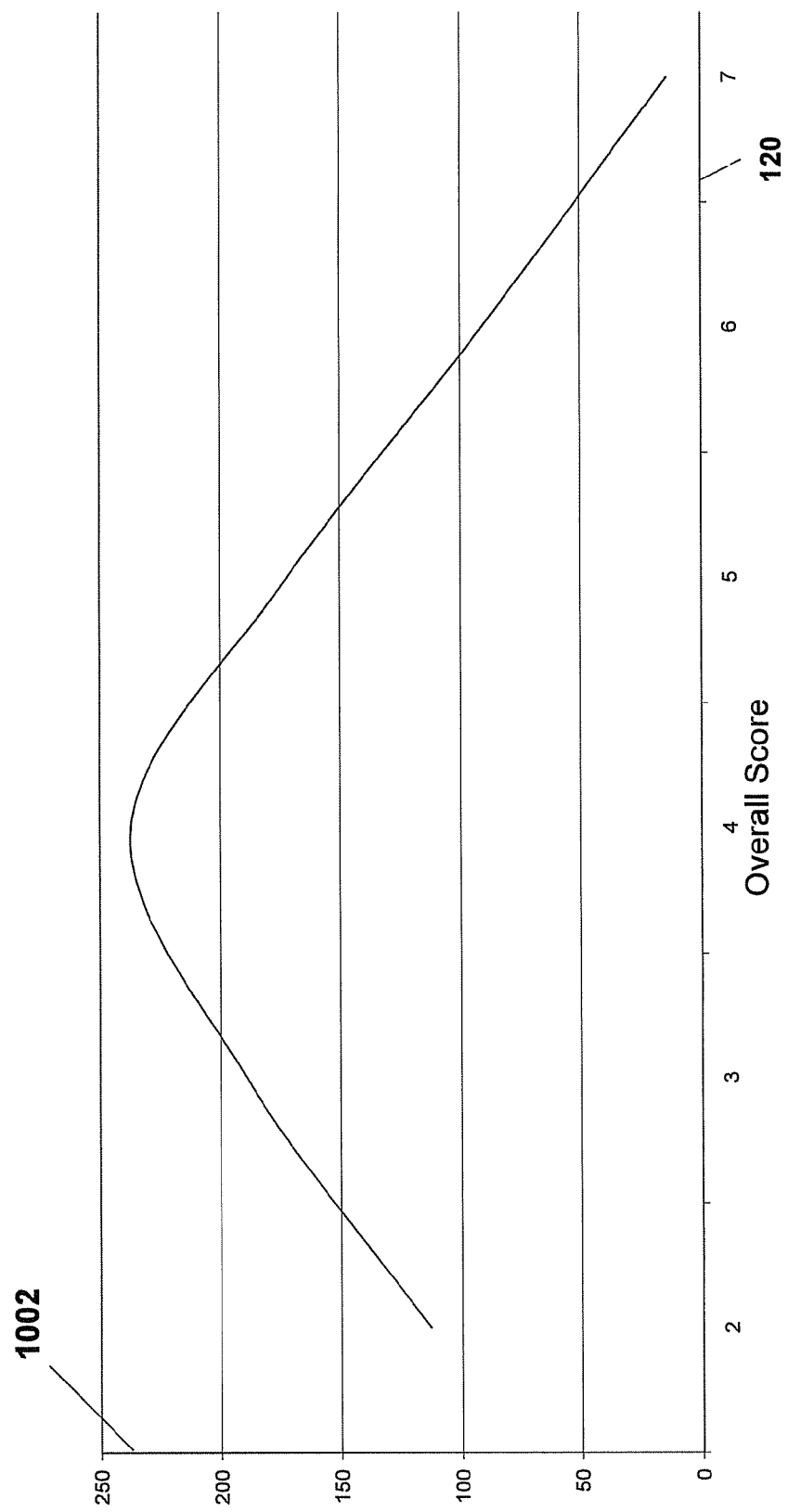
FIG. 10 illustrates an example graph of a total number of sample scenarios in a superset of sample scenarios that had a determined overall score.

FIG. 10 illustrates an example graph of a total number 1002 of sample scenarios 706 in a superset of sample scenarios 706 having a determined overall score 120 versus the determined overall score 120. The example graph exhibits a normal distribution with central bias around the overall score 120 of four. One or more questionnaires 200 may be adjusted to alter the shape of the graph. For example, one or more of the threshold category scores may be too low or too high. The function determining the overall scores 120 may, additionally or alternatively, be adjusted. For example, the overall scores 120 and/or the inconsistency indicators in the cells of the matrix illustrated in FIG. 9 may be modified to yield a desired overall score 120. For example, the overall scores 120 in the cells may be shifted in one direction or another within the matrix.

If new questionnaires 200 are replacing old questionnaires 200, a historical analysis may be made. For example, one or more factual scenarios may be selected that were typically subjected to the old questionnaires 200. For example, if business units each used one of the old questionnaires 200 to assess their respective clients, the factual scenarios selected may include one or more typical clients of each respective business unit.

For each of the factual scenarios, questions 202 included in the new questionnaires 200 may be answered appropriately based on each of the factual scenarios. An overall score 120 for each of the factual scenarios may be determined as the function 116 of the answers provided. In some examples, the questions 202 answered may be included in only one of the new questionnaires 200. In different examples, the questions 202 answered may be included in two or more of the new questionnaires 200.

The overall score 120 for each of the factual scenarios may also be determined using one or more of the old questionnaires 200. The overall scores 120 determined using the old questionnaires 200 may be compared with the overall scores 120 determined using the new questionnaires 200. In some examples, the overall scores 120 should be similar. In other examples, a different distribution may be desired when using the new questionnaires than when using the old questionnaires. For example, the old questionnaires 200 may exhibit an undesirable bias.

Figure 11:
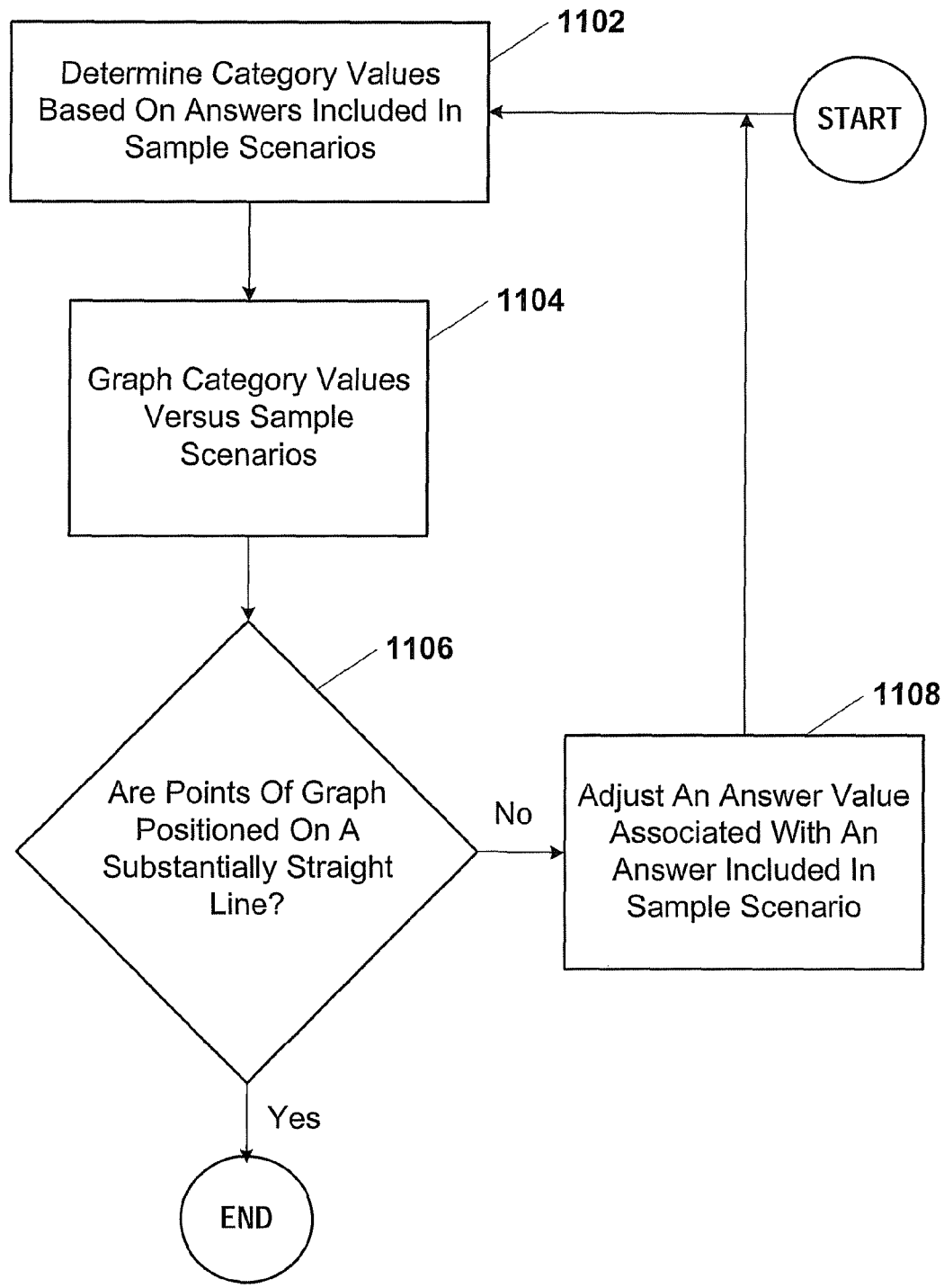
FIG. 11 illustrates one example of a flow diagram of a method to normalize multiple questionnaires.

FIG. 11 illustrates one example of a flow diagram of a method to normalize multiple questionnaires 200. Additional, different, or fewer acts may be performed. For example, the method may additionally include determining sample scenarios, where each of the sample scenarios corresponds to a permutation of the answers to each of the focus questions. The acts do not need to be performed in the order shown in FIG. 11.

In act 1102 of the example illustrated in FIG. 11, the method may begin by determining multiple category scores 712 and 714, where each of the category scores is determined based on answers 204 included in a corresponding one of the sample scenarios. The method may continue to act 1104 by generating a graph of the category scores versus the sample scenarios.

In act 1106, the method may proceed by verifying that the graph of the category scores versus the sample scenarios includes points positioned on a substantially straight line without substantial gaps between the points. If the graph is so verified, then the method may end. Alternatively, if the graph is not so verified, then the method may continue, for example, to act 1108 by adjusting the answer value associated with one of the answers included in the sample scenario corresponding to the point not on the substantially straight line.

At least one of the examples described above includes the use of different questionnaires to make assessments using a common assessment scale. In such examples, different questionnaires tailored to particular business needs may be used to make the assessment. The common assessment scale permits matching the assessment with, for example, products also assessed on the common assessment scale.

At least one of the examples described above includes an investment profile having three question categories. Using multiple question categories may improve a matching of the investor with product offerings than using the single overall score.

Additionally, at least one of the examples described above includes the question category that is the portfolio objective category 108. Including the category score corresponding to the portfolio objective category 108 in the investor profile provides more information about the investor's desires than category scores corresponding to the risk tolerance category 106 and the time horizon category 104.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other machine-readable media, for example, secondary storage devices such as hard disks, floppy disks, and CD-ROMs; a signal received from a network; or other forms of ROM or RAM either currently known or later developed. Moreover, the various modules and screen display functionality is but one example of such functionality and any other configurations encompassing similar functionality are possible.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. Programs may be parts of a single program, separate programs, or distributed across several memories and processors.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A system to facilitate analysis of an investment profiling questionnaire, the questionnaire used to determine an assessment from a plurality of answers selectable in response to a plurality of questions included in the questionnaire, the system comprising:
a memory;
a display;
an input device; and
a processor in communication with the memory, the display, and the input device, the memory comprising computer code executable with the processor, wherein the computer code includes:
computer code configured to receive a selection signal from the input device indicative of a user selection of a plurality of focus questions related to investment profiling and that are directed to a question category, the focus questions included in the questions;
computer code configured to receive entry of a scenario type from the input device, wherein the scenario type is one a plurality of scenario types, and each one of the scenario types describes a respective set of scenarios having common characteristics;

computer code configured to receive an identification of a set of predetermined answers to the focus questions that are applicable to the scenario type from the input device;

computer code configured to receive a plurality of sample investment scenarios from the input device, each one of the sample investment scenarios comprising a respective one of a plurality of permutations of the set of predetermined answers applicable to the scenario type;

computer code configured to determine a plurality of category scores, each of the category scores determined for a corresponding one of the sample investment scenarios based on the predetermined answers included in the corresponding one of the sample investment scenarios, wherein the computer code configured to determine the category scores is further configured to, for each corresponding one of the category scores:

sum each of a plurality of answer values associated with the predetermined answers included in a corresponding sample investment scenario with the processor to generate a sample scenario sum; and determine the corresponding one of the category scores as a division of the sample scenario sum by a highest possible category score determined based on any of the predetermined answers selectable in response to the focus questions;

computer code configured to generate an image of a graph of the category scores versus the sample investment scenarios on the display; and computer code configured to adjust, in response to user input that indicates one of the category scores is not indicative of the corresponding one of the sample investment scenarios, at least one of the answer values associated with the predetermined answers included in the corresponding one of the sample investment scenarios, the one of the category scores determined from the answer values.

2. The system of claim 1, wherein the selection signal is a first selection signal and the computer code further includes computer code configured to receive a second selection signal from the input device indicative of a user assignment of each of the predetermined answers included in the sample investment scenarios to an applicable one of the scenario types.

3. A method of normalizing a plurality of investment profiling questionnaires, wherein a plurality of questions are included in the questionnaires, and each of the questionnaires after normalization is useable to consistently determine an assessment from a plurality of answers selectable in response to the questions included in each respective one of the questionnaires regardless of which of the questionnaires is used, the method comprising:

verifying whether a category score is consistently determined by a processor regardless of which of the questionnaires is used by the processor, wherein the category score is included in the assessment, the category score is determined by the processor as a function of the answers provided in response to each of the questions included in a questionnaire that are directed to a question category, and the processor stores the category score in a memory; and wherein verifying whether the category score is consistently determined includes:

selecting a plurality of focus questions related to investment profiling from among the questions directed to the question category;

selecting a scenario type from a plurality of scenario types, each one of the scenario types describes a respective set of scenarios having common characteristics;

determining a set of predetermined answers to the focus questions that are applicable to the scenario type;

determining permutations of the set of predetermined answers applicable to the scenario type;

determining a plurality of sample investment scenarios, each one of the sample investment scenarios comprising a respective one of the permutations of the set of predetermined answers applicable to the scenario type, the sample investment scenarios stored in the memory;

determining a plurality of category scores with the processor, each of the category scores determined for a corresponding one of the sample investment scenarios based on the predetermined answers included in the corresponding one of the sample investment scenarios, the category scores included in the memory and displayed in a display, wherein determining the category scores includes determining each of the category scores by:

summing each of a plurality of answer values associated with each corresponding one of the determined answers included in a corresponding sample investment scenario with the processor to generate a sum; and dividing, with the processor, the sum by a highest possible category score determined based on any of the determined answers selectable in response to the focus questions;

verifying a graph of the category scores versus the sample investment scenarios on a display comprises a plurality of points positioned on a straight line;

verifying that each of the category scores is indicative of the corresponding one of the sample investment scenarios; and adjusting, in response to a determination that one of the category scores is not indicative of the corresponding one of the sample investment scenarios, at least one of the answer values associated with the predetermined answers included in the corresponding one of the sample investment scenarios, the one of the category scores determined from the answer values.

4. The method of claim 3, wherein selecting the focus questions includes selecting from among the questions included in two or more of the questionnaires.

5. The method of claim 3, further comprising:

determining, with the processor, a plurality of overall scores corresponding to the sample investment scenarios, wherein each of the overall scores is determined based on the determined answers included in the corresponding one of the sample investment scenarios.

6. The method of claim 5, wherein determining the overall scores corresponding to the sample investment scenarios includes determining the overall scores with the processor based on the category scores.

7. The method of claim 3, further comprising adjusting an answer value associated with an answer to one of the questions in response to the category score equaling an unexpected category score.

8. The method of claim 3, further comprising:

providing a plurality of assessed types, wherein the assessment includes one of the assessed types; and determining a plurality of value ranges, each of the value ranges corresponding to a respective one of the assessed types, wherein each of the value ranges includes a plurality of possible category scores indicative of a corresponding one of the assessed types.

9. The method of claim 8, further comprising adjusting at least one of the value ranges, wherein the value ranges, as adjusted, is useable for each of the questionnaires to consistently determine the assessed type.

10. The method of claim 3, wherein verifying the category score further includes determining a plurality of distinct questions directed to the question category, wherein each of the distinct questions is included in at least one of the questionnaires, and wherein selecting the focus questions includes selecting the focus questions from among the distinct questions.

11. The method of claim 3, wherein verifying the category score includes analyzing the sample investment scenarios as applied to the focus questions selected from the questions directed to the question category.

12. The method of claim 11, wherein analyzing the sample investment scenarios includes determining a set of the sample investment scenarios applicable to one of the scenario types.

13. The method of claim 11, wherein the sample investment scenarios are a plurality of first sample investment scenarios, the focus questions are a plurality of first focus questions, and verifying the category score includes analyzing a plurality of second sample investment scenarios as applied to a plurality of second focus questions selected from the questions directed to the question category.

14. The method of claim 13, wherein verifying the category score includes analyzing a plurality of third sample investment scenarios as applied to a combination of the first focus questions and the second focus questions, wherein the third sample investment scenarios are determined from all of the determined answers included in the first sample investment scenarios and the second investment sample scenarios.

15. The method of claim 3, further comprising verifying an overall score is consistently determined regardless of which of the questionnaires is used.

16. The method of claim 15, wherein verifying the overall score includes analyzing a plurality of overall scores determined as a function of the sample investment scenarios.

* * * * *

UNITED STATES PATENT AND TRADEMARK OFFICE
CERTIFICATE OF CORRECTION

PATENT NO. : 8,086,483 B1
APPLICATION NO. : 12/247128
DATED : December 27, 2011
INVENTOR(S) : Yuan et al.

Page 1 of 1

It is certified that error appears in the above-identified patent and that said Letters Patent is hereby corrected as shown below:

In the Specification

Column 13, Line 44, please insert --be-- after --may--.

Signed and Sealed this
Twenty-eighth Day of February, 2012

David J. Kappos
*Director of the United States Patent and Trademark Office*